Sept. 25, 1928.
E. V. GLUCK
1,685,603
GRID LEAK
Original Filed Nov. 12, 1925
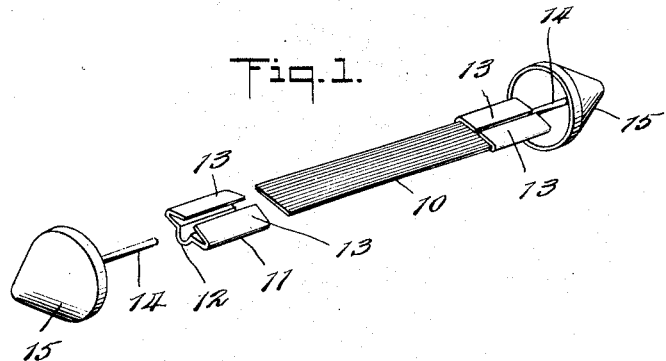
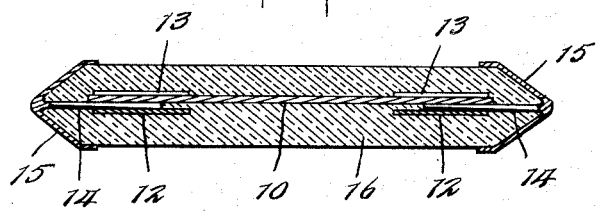
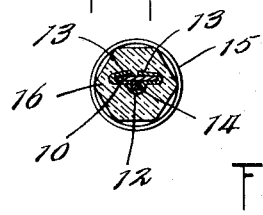 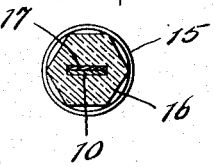
INVENTOR.
Edward V. Gluck
BY
ATTORNEY.

Patented Sept. 25, 1928.

1,685,603

UNITED STATES PATENT OFFICE.

EDWARD V. GLUCK, OF WOODHAVEN, NEW YORK.

GRID LEAK.

Application filed November 12, 1925, Serial No. 68,673. Renewed August 11, 1928.

Among the principal objects which the present invention has in view are:—

To provide an improved and novel grid leak construction for use in connection with radio sets; to provide a simple and novel grid leak and insulating body therefor; and to provide in a grid leak an improved and novel terminal attaching and mounting means.

*Drawings.*

Figure 1 is a perspective of the interior construction of my improved grid leak illustrating the elements before assembly;

Figure 2 is a central longitudinal section through a completed grid leak;

Figure 3 is a transverse vertical section taken through the grid leak adjacent one end thereon;

Figure 4 is a central transverse section through the grid leak;

Figure 5 is a section similar to Figure 4 illustrating a slightly modified form of construction.

*Description.*

In detail the invention comprises a thin strip of carbon paper 10 disposed between end clamps 11 formed of metal blanks provided with a longitudinal groove 12 and overturned binding flanges 13 on the opposite side edges for clamping engagement over the ends of the strip 10.

The clamping members 11 are formed of suitable metal, the longitudinal grooves 12 being disposed therein for the reception beneath the ends of the carbon strip 10 of the stems 14 of a pair of upholstery tacks having open ended conical heads 15.

With the elements as described disposed in assembled position the clamping flanges 13 of the end clips are fastened down to bind the tack stems 14 to the carbon strip and a body 16 of a suitable insulating cement is formed around the carbon strip and end clips extending into the chambers formed in the interior of the heads 15 presenting a finished article having a rigid insulating body capped at each end by electroconductive terminal members adapted for reception in the conventional grid leak receiving fingers of radio sets. The cement body 16 may be moulded in the hexagonal shape illustrated in Figures 3 and 4, and if desired the carbon strip 10 may be doubled upon itself to provide the strip 17 illustrated in the modified construction shown in Figure 5. It is obvious that the capacity of the grid leak is dependent upon the length of the carbon strip 10 and the amount of conductive material disposed thereon.

Claims:—

1. A grid leak comprising a resistance element in the form of a strip, hollow headed terminal members disposed at opposite ends of said strip, stems on said members and extending beneath said strip, binding clips clamped over the opposite end of said strip and stems serving to maintain the stems in contact with the strip, and a rigid body formed of insulating cement moulded over said strip between said terminal heads, the insulating material extending into the hollow heads of the terminal members and being held in service thereby.

2. A grid leak comprising a strip of carbon paper, a pair of terminal members adapted to be attached to opposite ends of said strip, metal clamping members disposed over the opposite ends of said strip, stems carried by said terminal members and clamped between the clamping members and the ends of said strip, and a rigid body formed of insulating cement moulded over said strip between said terminal members.

EDWARD V. GLUCK.